(12) United States Patent
Sandy et al.

(10) Patent No.: US 7,620,047 B2
(45) Date of Patent: *Nov. 17, 2009

(54) METHOD OF TRANSPORTING A RAPIDIO PACKET OVER AN IP PACKET NETWORK

(75) Inventors: Douglas L. Sandy, Chandler, AZ (US); Jeffrey M. Harris, Chandler, AZ (US); Robert C. Tufford, Chandler, AZ (US)

(73) Assignee: Emerson Network Power - Embedded Computing, Inc., Madison, WI (US)

( * ) Notice: Subject to any disclaimer, the term of this patent is extended or adjusted under 35 U.S.C. 154(b) by 698 days.

This patent is subject to a terminal disclaimer.

(21) Appl. No.: 10/997,300

(22) Filed: Nov. 23, 2004

(65) Prior Publication Data

US 2006/0109845 A1    May 25, 2006

(51) Int. Cl.
*H04L 12/28* (2006.01)
*H04J 3/16* (2006.01)

(52) U.S. Cl. ...................... 370/392; 370/466
(58) Field of Classification Search ................. 370/389, 370/392, 395.5–395.6, 401, 466, 469
See application file for complete search history.

(56) References Cited

U.S. PATENT DOCUMENTS

| | | | |
|---|---|---|---|
| 5,083,259 A | 1/1992 | Maresh et al. | |
| 5,544,162 A | 8/1996 | Mraz et al. | |
| 6,151,318 A | 11/2000 | Woodward et al. | |
| 6,393,033 B1 | 5/2002 | Woodward et al. | |
| 6,400,730 B1 | 6/2002 | Latif et al. | |
| 6,625,169 B1 * | 9/2003 | Tofano | 370/466 |
| 6,654,355 B1 | 11/2003 | Marbach et al. | |
| 6,662,254 B1 | 12/2003 | Tal et al. | |
| 6,681,262 B1 | 1/2004 | Rimmer | |
| 6,748,459 B1 | 6/2004 | Lin et al. | |
| 6,895,461 B1 * | 5/2005 | Thompson | 710/305 |
| 6,959,007 B1 | 10/2005 | Vogel et al. | |
| 6,985,991 B2 | 1/2006 | Harris et al. | |
| 6,999,409 B2 * | 2/2006 | Oyamada | 370/218 |
| 6,999,434 B1 * | 2/2006 | Agrawal et al. | 370/331 |
| 7,120,725 B2 * | 10/2006 | Sandy et al. | 710/314 |
| 7,242,684 B2 * | 7/2007 | Nakagawa et al. | 370/389 |
| 7,245,617 B2 * | 7/2007 | Nakagawa | 370/389 |
| 7,248,596 B2 * | 7/2007 | Shimizu | 370/413 |

(Continued)

OTHER PUBLICATIONS

RapidO, The Interconnect Architecture for Networking, 47 pages, Jan. 2002.

(Continued)

*Primary Examiner*—Hong Cho
(74) *Attorney, Agent, or Firm*—Harness, Dickey & Pierce, P.L.C.

(57) ABSTRACT

A method of transporting a RapidIO packet (135) from an initiator RapidIO domain (102) over an IP packet network (110) to a receiver RapidIO domain (104) can include the initiator RapidIO domain creating the RapidIO packet and reading a destination domain ID (483) of the RapidIO packet, where the destination domain ID corresponds to the receiver RapidIO domain. The destination domain ID is mapped to a receiver RapidIO domain IP address (473). The RapidIO packet is encapsulated in an IP packet (436) and the IP packet is communicated to the receiver RapidIO domain over the IP packet network.

23 Claims, 5 Drawing Sheets

U.S. PATENT DOCUMENTS

| | | |
|---|---|---|
| 7,277,449 B2 | 10/2007 | Garinger et al. |
| 2002/0085563 A1 | 7/2002 | Mesh et al. |
| 2003/0012190 A1 | 1/2003 | Kaku et al. |
| 2003/0219015 A1 | 11/2003 | Constant Six et al. |
| 2004/0010612 A1* | 1/2004 | Pandya ........................ 709/230 |
| 2004/0013118 A1 | 1/2004 | Borella |
| 2004/0172479 A1 | 9/2004 | Ksinant et al. |
| 2004/0172494 A1 | 9/2004 | Pettey et al. |
| 2005/0102437 A1 | 5/2005 | Pettey et al. |
| 2005/0188105 A1 | 8/2005 | Reinhard et al. |
| 2005/0238035 A1* | 10/2005 | Riley ........................... 370/401 |
| 2005/0256989 A1 | 11/2005 | Wolfe et al. |
| 2006/0067318 A1 | 3/2006 | Gorodetsky et al. |
| 2006/0075123 A1 | 4/2006 | Burr et al. |
| 2006/0109845 A1 | 5/2006 | Sandy et al. |

OTHER PUBLICATIONS

Hyun, E. & Seong, K: The Effective Buffer Architecture for Data Link of the PCI Express, Proc. of the Intl' Conf. on Info Tech: Coding and Computing (ITCC'04), IEEE ISBN 0-7695-2108-8/04, 2004 (p. 2).

* cited by examiner

METHOD OF TRANSPORTING A RAPIDIO PACKET OVER AN IP PACKET NETWORK

BACKGROUND OF THE INVENTION

RapidIO is a packet-switched system level interconnect intended primarily as an intra-system interface allowing chip-to-chip and board-to-board communications at Gigabyte per second transfer speeds. RapidIO does not have a physical layer that supports use over long distances.

Internet Protocol (IP) is the world's most popular open-system (nonproprietary) protocol suite because it can be used to communicate across any set of Interconnected networks and is equally well suited for LAN and WAN communications. The prior art does not provide a means to transport LAN-centric RapidIO packets over the ubiquitous IP network. This has the disadvantage in that local networks using RapidIO must translate packetized data between the RapidIO and IP protocols to interface with the longer-haul IP networks. This has the disadvantage of increasing costs and slowing network operation.

Accordingly, there is a significant need for an apparatus and method that overcomes the deficiencies of the prior art outlined above.

BRIEF DESCRIPTION OF THE DRAWINGS

Referring to the drawing.

Figure 1:
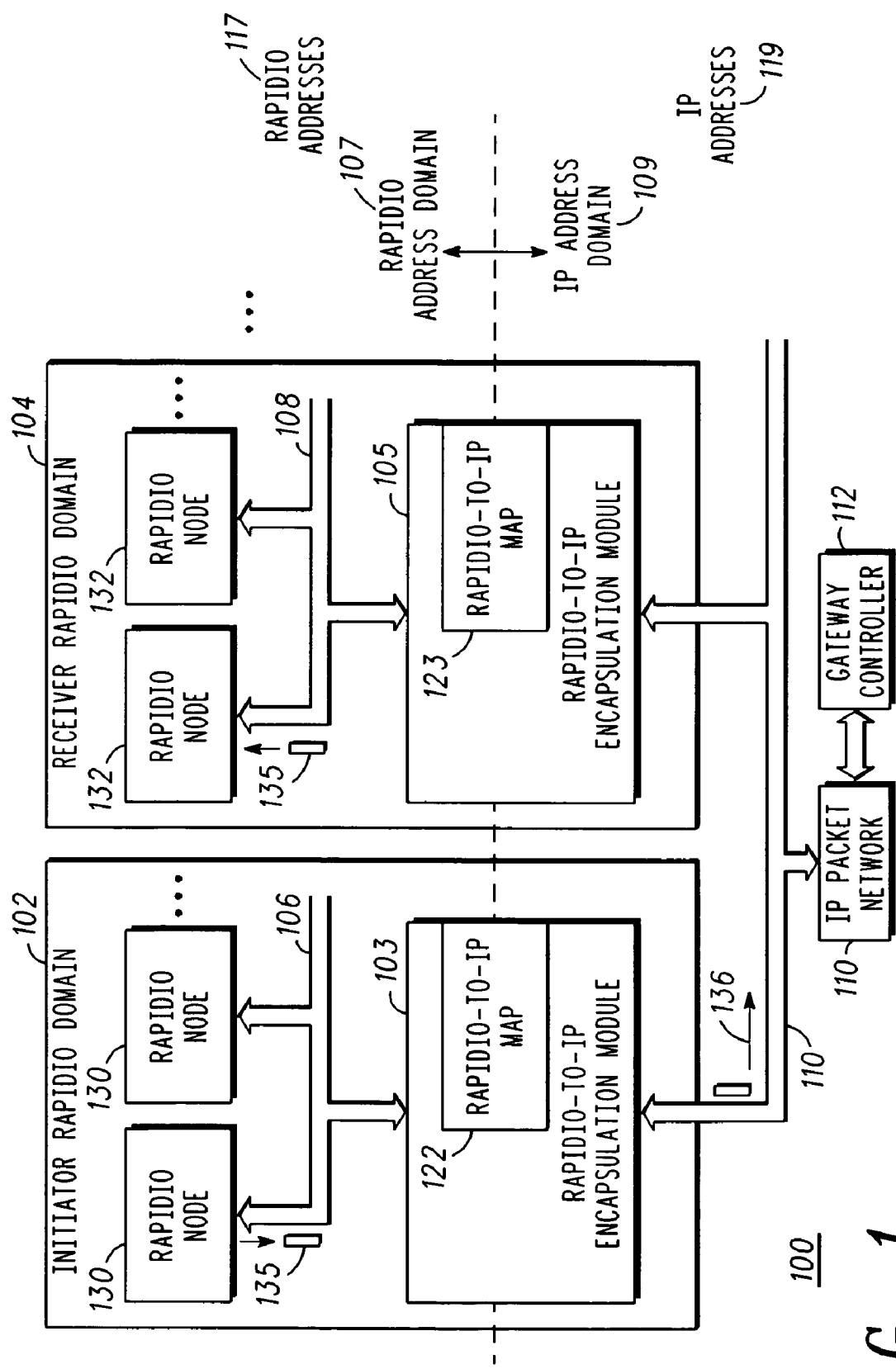
FIG. 1 depicts a computer network according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

Description of the Preferred Embodiments

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a computer network 100 according to one embodiment of the invention. Computer network 100 can include an IP packet network 110 coupled to a gateway controller 112. IP packet network 110 can operate using a suite of communication protocols known in the art, of which the two best known are the Transmission Control Protocol (TCP) and the Internet Protocol (IP). The Internet protocol suite not only includes lower-layer protocols (such as TCP and IP), but also can specify common applications such as electronic mail, terminal emulation, and file transfer.

The Internet Protocol is a network-layer protocol that contains addressing information and some control information that enables packets to be routed. IP is the primary network-layer protocol in the Internet protocol suite. Along with the Transmission Control Protocol, IP represents the heart of the Internet protocols. IP has two primary responsibilities: providing connectionless, best-effort delivery of packets through an internetwork of domains; and providing fragmentation and reassembly of packets to support data links with different maximum-transmission unit (MTU) sizes.

Gateway controller 112 can be used to allow individual domains coupled to IP packet network 110 to extract their configurations. In other words, individual domains coupled to IP packet network 110 can extract their configuration from gateway controller 112. In an example, gateway controller 112 may not have any information on an individual domain coupled to IP packet network 110 until that individual domain requests information. An example of gateway controller 112 can be a Dynamic Host Configuration Protocol (DHCP) server. DHCP is an Internet protocol for automating the configuration of computers that use TCP/IP. DHCP can be used to automatically assign IP addresses, to deliver TCP/IP stack configuration parameters such as the subnet mask and default router, and to provide other configuration information for example addresses for printer, time and news servers.

RapidIO™ is designed to be compatible with integrated communications processors, host processors, and networking digital signal processors. RapidIO™ is a high-performance, packet-switched, interconnect technology. The RapidIO interconnect allows chip-to-chip and board-to-board communications at performance levels scaling to ten Gigabits per second and beyond. The RapidIO specification is managed and disseminated through the RapidIO Trade Association and can be found at www.rapidio.org. The RapidIO specification is incorporated herein by reference.

Computer network 100 can include any number of RapidIO domains 102, 104 coupled to IP packet network 110. By way of example, RapidIO domain 102 can be any board, chassis, network or system that includes one or more RapidIO nodes 130 coupled by a RapidIO network 106. RapidIO node 130 can include, but is not limited to, a processor, memory device, storage device, wireline or wireless communication device, and the like. RapidIO node 130 is coupled to communicate on RapidIO network 106 using RapidIO packets 135 as described in the RapidIO specification. In an embodiment, each RapidIO node 130 is coupled to RapidIO network 106. In an embodiment, RapidIO network 106 is coupled to RapidIO-to-IP encapsulation module 103 which can function to encapsulate and de-encapsulate RapidIO packets 135 in and out of IP packets as explained more fully below. Although RapidIO domain 102, 104 is depicted with two RapidIO nodes, any number of RapidIO nodes are within the scope of the invention. For example, RapidIO domain 102, 104 can include one or more RapidIO nodes.

In an embodiment, computer network 100 can include a RapidIO address domain 107 comprising a plurality of RapidIO addresses 117. RapidIO addresses 117 are only recognizable and readable within a local RapidIO network such as RapidIO network 106 and can include, for example, one or more memory address spaces. For example, RapidIO addresses on RapidIO domain 102 may only be recognizable and relevant to RapidIO nodes 130 coupled to RapidIO network 106 as they reference one or more unique memory address spaces on RapidIO domain 102. Also, RapidIO domain 104 can have its own set of RapidIO addresses relevant only to RapidIO nodes 132 coupled to RapidIO network 108 on RapidIO domain 104. As RapidIO addresses 117 are relevant only in a particular domain, such as RapidIO domain 102 or RapidIO domain 104, they generally cannot be used to address packets going from one RapidIO domain to another RapidIO domain.

Although RapidIO addresses 117 can be used to specify a destination ID for a RapidIO packet 135 going from initiator RapidIO domain 102 to receiver RapidIO domain 104, these RapidIO addresses 117 are not recognizable to IP packet network 110. Therefore, any RapidIO packet 135 addressed from initiator RapidIO domain 102 to receiver RapidIO domain 104 cannot travel over IP packet network 110 by itself.

In an embodiment, RapidIO domain 102 can include RapidIO-to-IP encapsulation module 103 coupled to RapidIO network 106 and to IP packet network 110. In an embodiment, RapidIO-to-IP encapsulation module 103 can include any combination of hardware, software, and the like. RapidIO-to-IP encapsulation module 103 can function to encapsulate a RapidIO packet 135 into an IP packet 136 for transport over IP packet network 110. RapidIO-to-IP encapsulation module 103 can also function to de-encapsulate a RapidIO packet 135 from an IP packet 136 so the RapidIO packet 135 can be communicated over RapidIO network 108.

RapidIO domain 104 can also include any number of RapidIO nodes 132 coupled by RapidIO network 108. RapidIO domain 104 can also include RapidIO-to-IP encapsulation module 105 that functions to encapsulate and de-encapsulate a RapidIO packet 135 in a manner analogous to that described with reference to RapidIO-to-IP encapsulation module 103 in RapidIO domain 102.

In an embodiment, upon power-up or boot-up of computer network 100, initiator RapidIO domain 102 can determine a RapidIO ID map, which can be for example a list of all RapidIO ID's of each of the RapidIO nodes 130 on RapidIO domain 102. In an embodiment, RapidIO ID map 122 can be a list of the RapidIO ID's of all RapidIO nodes 130 capable of sending, receiving, and the like, a RapidIO packet 135. The same procedure can be repeated for RapidIO domain 104 which can generate a RapidIO ID map 123 in an analogous manner.

In an embodiment, also upon power-up or boot-up of computer network 100, each RapidIO domain 102, 104 can request and receive from gateway controller 112, an IP address. Each IP address for each RapidIO domain in computer network 100 can be unique so as to uniquely identify each RapidIO domain on IP packet network 110. As is known in the art, an IP address can be used to uniquely identify a domain that is making use of IP packet network 110. The IP address can be used by the IP packet network 110 to direct data to each RapidIO domain 102, 104. In one embodiment, it can be the task of gateway controller 112 to get a functional and unique IP number to each RapidIO domain 102, 104 that make use of IP packet network 110. In another embodiment, gateway controller 112 does not assign IP addresses as IP addresses for each of RapidIO domains 102, 104 can be static or determined at the RapidIO domain itself.

In an embodiment, gateway controller 112 can quely each RapidIO domain in computer network 100 to communicate its RapidIO ID map 122, 123. For example, gateway controller 112 can determine if a domain in computer network 100 is a RapidIO domain. If it is, then gateway controller 112 can request that the RapidIO domain communicate its RapidIO ID map 122, 123.

Upon receipt of all RapidIO ID maps from RapidIO domains 102, 104 in computer network 100, gateway controller 112 can build a RapidIO-to-IP map 122, 123. In an embodiment, RapidIO-to-IP map 122, 123 can be a look-up table, database, list, algorithm, and the like.

In an embodiment RapidIO-to-IP map 122, 123 for each RapidIO domain 102, 104 corresponds each RapidIO domain to an IP address. In an embodiment, IP address can be for a single RapidIO node constituting the RapidIO domain. In another embodiment, the IP address can correspond to a RapidIO domain with multiple RapidIO nodes.

In an embodiment, after gateway controller 112 builds RapidIO-to-IP map 122, 123, gateway controller 112 can communicate RapidIO-to-IP map 122, 123 to each RapidIO domain 102, 104 in computer network 100. For example, gateway controller 112 can communicate RapidIO-to-IP map 122 to RapidIO-to-IP encapsulation module 103 on RapidIO domain 102.

In another embodiment, RapidIO-to-IP map 122, 123 can be created at each respective RapidIO-to-IP encapsulation module 103, 105. In this embodiment, RapidIO ID maps are not sent to gateway controller 112 as the RapidIO-to-IP map is constructed locally at each RapidIO domain. The invention is not limited to computer networks having only RapidIO domains. Computer network 100 can include other domains coupled to IP packet network 110 that function using another protocol besides RapidIO.

An exemplary embodiment of a method of transporting a RapidIO packet 135 from initiator RapidIO domain 102, over IP packet network 110, to receiver RapidIO domain 104 will now be described. In an embodiment, RapidIO node 130 at initiator RapidIO domain 102 can create RapidIO packet 135 having a destination ID correlating to a RapidIO node 132 in RapidIO domain 104. In this embodiment, RapidIO packet 135 is required to traverse IP packet network 110.

RapidIO packet 135 can be communicated over RapidIO network 106 at initiator RapidIO domain 102 to RapidIO-to-IP encapsulation module 103 where a destination ID is read. In an embodiment, RapidIO-to-IP encapsulation module 103 can use RapidIO-to-IP map 122 to map a destination ID of RapidIO packet 135 to a receiver RapidIO domain IP address (to be discussed more fully with reference to FIGS. 4 and 5 below). In an embodiment, receiver RapidIO domain IP address can be placed in an IP header of the IP packet 136. In accordance with mapping, RapidIO packet 135 can be encapsulated in an IP packet 136, where IP packet 136 is communicated to receiver RapidIO domain 104 over IP packet network 110.

In an embodiment, upon receipt of IP packet 136 at receiver RapidIO domain 104, RapidIO-to-IP encapsulation module 105 can de-encapsulate RapidIO packet 135 from IP packet 136. RapidIO-to-IP map 123 at receiver RapidIO domain 104 can be used to map receiver RapidIO domain IP address back to destination ID, with destination ID placed in a RapidIO header of RapidIO packet 135. Thereafter, RapidIO packet 135 can be issued via RapidIO network 108 to RapidIO node 132.

Figure 2:
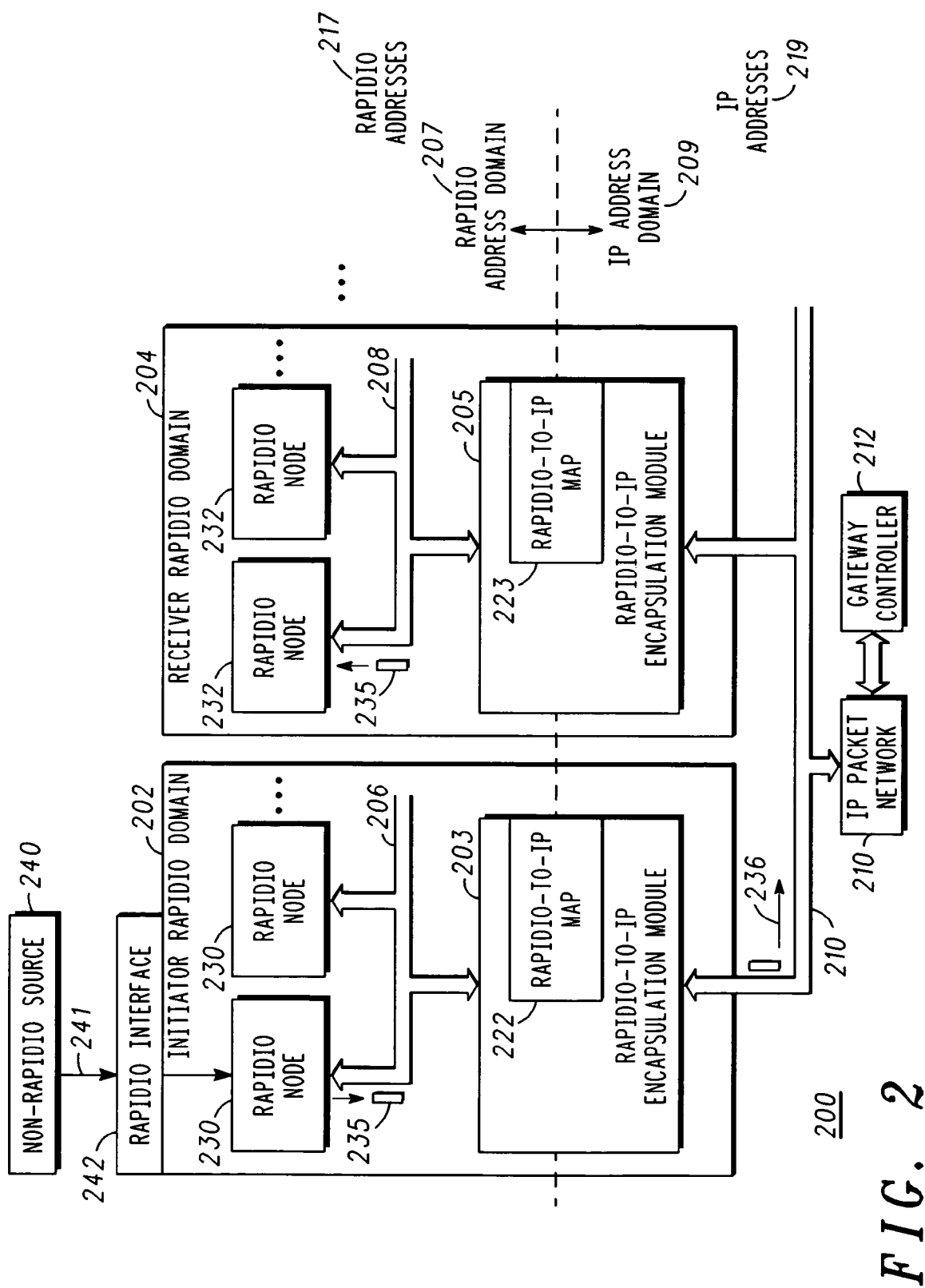
FIG. 2 depicts a computer network according to another embodiment of the invention.

FIG. 2 depicts a computer network 200 according to another embodiment of the invention. In the embodiment depicted in FIG. 2, like numbered elements represent like elements as discussed with reference to FIG. 1.

As shown in FIG. 2, an initiator RapidIO domain 202 can be coupled to a non-RapidIO source 240. In an embodiment, non-RapidIO source 240 can be any network, processor, payload card, computing element, and the like, that operates using a protocol other than RapidIO. For example, non-RapidIO source 240 can be a source that operates using protocols such as PCI, PCI-X, PCI Express, VMEbus, Infiniband, and the like.

In an embodiment, non-RapidIO source 240 can transmit a transaction signal 241 ultimately destined for receiver RapidIO domain 204. Transaction signal 241 can be any transmission designed to convey data from non-RapidIO source 240 to a RapidIO domain, for example initiator RapidIO domain 202 or receiver RapidIO domain 204. Transaction signal 241 communicated by non-RapidIO source 240 is in a format and uses a protocol other than RapidIO.

Transaction signal 241 can be received by initiator RapidIO domain 202, particularly at RapidIO interface 242 of initiator RapidIO domain 202. In one embodiment, RapidIO interface 242 can be a memory-mapped interface where data from transaction signal 241 can be mapped directly to memory in initiator RapidIO domain 202. In another embodiment, RapidIO interface 242 can be a port-mapped interface. In this embodiment, data from transaction signal 241 is not directly mapped to memory but can register in memory in initiator RapidIO domain 202 and await further processing and instructions from a processor in initiator RapidIO domain 202 or a RapidIO node 230.

In an embodiment, initiator RapidIO domain 202 or RapidIO node 230 can create RapidIO packet 235 with data from transaction signal 241. RapidIO packet 235 can have a destination ID correlating to a RapidIO node 232 in RapidIO domain 204. In this embodiment, RapidIO packet 235 is required to traverse IP packet network 210.

RapidIO packet 235 can be communicated over RapidIO network 206 at initiator RapidIO domain 202 to RapidIO-to-IP encapsulation module 203 where a destination ID is read. In an embodiment, RapidIO-to-IP encapsulation module 203 can use RapidIO-to-IP map 222 to map a destination ID of RapidIO packet 235 to a receiver RapidIO domain IP address. In an embodiment, receiver RapidIO domain IP address can be included in a header of the IP packet 236. In accordance with mapping, RapidIO packet 235 can be encapsulated in an IP packet 236, where IP packet 236 is communicated to receiver RapidIO domain 204 over IP packet network 210.

In an embodiment, upon receipt of IP packet 236 at receiver RapidIO domain 204, RapidIO-to-IP encapsulation module 205 can de-encapsulate RapidIO packet 235 from IP packet 236. RapidIO-to-IP map 223 at receiver RapidIO domain 204 can be used to map receiver RapidIO domain IP address back to destination ID, with destination ID placed in a RapidIO header of RapidIO packet 235. Thereafter, RapidIO packet 235 can be issued via RapidIO network 208 to RapidIO node 232.

Figure 3:
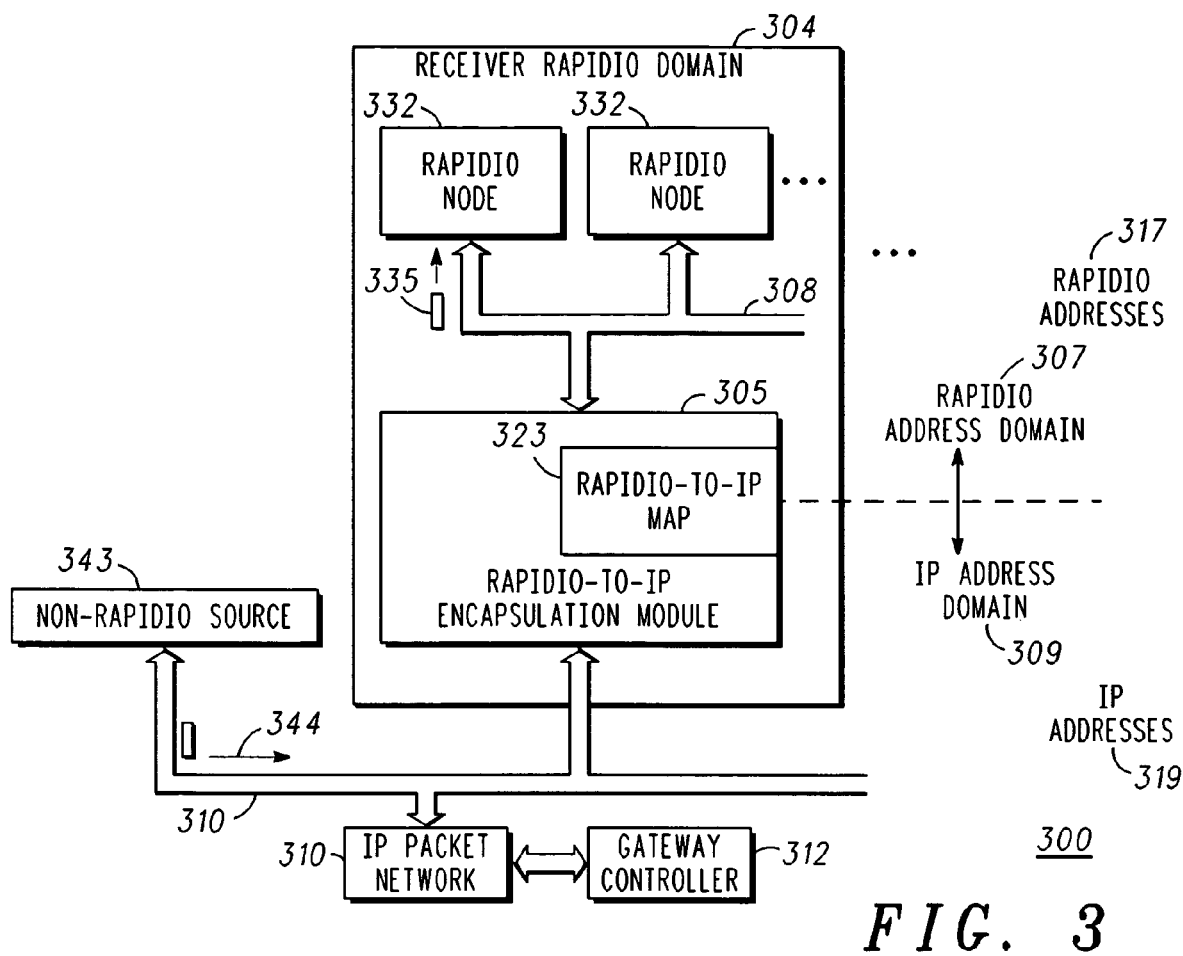
FIG. 3 depicts a computer network according to yet another embodiment of the invention.

FIG. 3 depicts a computer network 300 according to yet another embodiment of the invention. In the embodiment depicted in FIG. 3, like numbered elements represent like elements as discussed with reference to FIG. 1.

As shown in FIG. 3, IP packet network 310 can be coupled to a non-RapidIO source 343. In an embodiment, non-RapidIO source 343 can be any network, processor, payload card, computing element, and the like, that operates using a protocol other than RapidIO. For example, non-RapidIO source 343 can be a source that operates using protocols such as PCI, PCI-X, PCI Express, VMEbus, Infiniband, and the like. In another embodiment, non-RapidIO source 343 can include software capable of generating transaction signal 344, where the software outputs bit code without using any particular protocol.

In an embodiment, non-RapidIO source 343 can transmit a transaction signal 344 ultimately destined for receiver RapidIO domain 304. Transaction signal 344 can be any transmission designed to convey data from non-RapidIO source 343 to a RapidIO domain, for example receiver RapidIO domain 304. Transaction signal 344 communicated by non-RapidIO source 343 is in a format and uses a protocol other than RapidIO.

Transaction signal 344 initiated by non-RapidIO source 343 can be formatted as an IP packet to traverse IP packet network 310. For example, transaction signal 344 can have a RapidIO domain IP address. In an embodiment, transaction signal 344, while formatted as an IP packet, can contain data such that upon receipt by receiver RapidIO domain 304 a RapidIO packet 335 is generated by RapidIO-to-IP encapsulation module 305. For example, the payload portion of an IP packet generated by non-RapidIO source can contain data such that a RapidIO packet 335 is generated by receiver RapidIO domain 304, particularly, RapidIO-to-IP encapsulation module 305. In an embodiment, a destination node ID can be mapped from receiver RapidIO domain IP address and placed in a RapidIO header of RapidIO packet 335. Thereafter, RapidIO packet 335 can be issued via RapidIO network 308 to RapidIO node 332.

Figure 4:
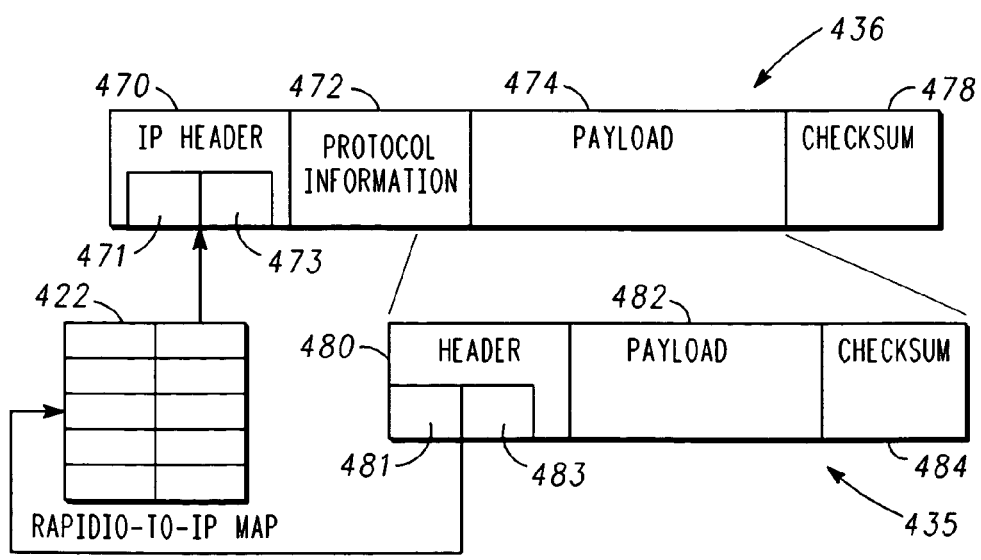
FIG. 4 depicts a RapidIO packet encapsulated into an IP packet according to an embodiment of the invention.

FIG. 4 depicts a RapidIO packet 435 encapsulated into an IP packet 436 according to an embodiment of the invention. The IP header 470 can include things such as the destination IP address, source IP address, version, flags, length, and the like. Protocol information 472 can include the protocol used in the payload field 474 including what upper layer protocol is to receive incoming packets after IP processing. Checksum 478 can ensure packet integrity.

RapidIO packet 435 can include RapidIO header 480, which can include source domain ID 481 and the destination domain ID 483 to indicate the source and destination of the RapidIO packet 435 respectively. Payload 482 can include the data being transported by RapidIO packet 435. Checksum 484 ensures RapidIO packet integrity.

In an embodiment, RapidIO packet 435 can be created by a RapidIO node in an initiator RapidIO domain as described above. In an embodiment, RapidIO packet 435 can include source domain ID 481 and destination domain ID 483 in header 480. These domain ID's can indicate both the source of the RapidIO packet 435 and the destination domain or node of the RapidIO packet 435.

In an embodiment, RapidIO-to-IP encapsulation module in initiator RapidIO domain can include RapidIO-to-IP map 422. Upon arrival at RapidIO-to-IP encapsulation module, destination domain ID 483 can be read and mapped to receiver RapidIO domain IP address 473. In an embodiment, source domain ID 481 can also be mapped to source RapidIO domain IP address 471. In an embodiment, receiver RapidIO domain IP address 473 is placed in IP header 470 such that IP packet 436 is addressed to receiver RapidIO domain corresponding to receiver RapidIO domain IP address 473. In other words, IP packet 436 is addressed to receiver RapidIO domain having RapidIO node to which RapidIO packet 435 is destined. RapidIO packet 435 can then be encapsulated in payload field 474 of IP packet 436 as shown in FIG. 4.

Figure 5:
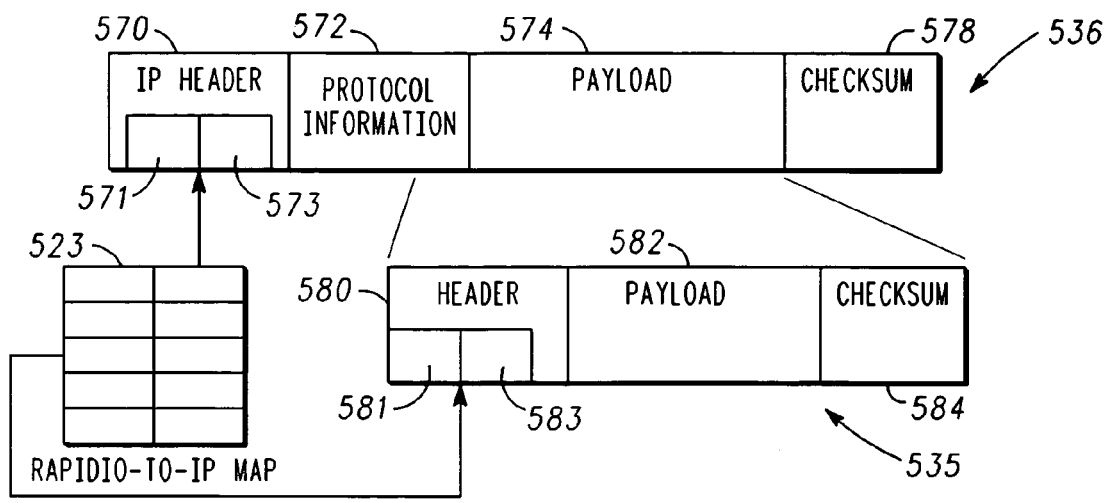
FIG. 5 depicts a RapidIO packet de-encapsulated from an IP packet according to an embodiment of the invention.

FIG. 5 depicts a RapidIO packet 535 de-encapsulated from an IP packet 536 according to an embodiment of the invention. In the embodiment depicted in FIG. 5, like numbered elements represent like elements as discussed with reference to FIG. 4.

When IP packet 536 arrives at receiver RapidIO domain, the reverse of the process described in FIG. 4 can occur. For example, RapidIO-to-IP encapsulation module at receiver RapidIO domain can use RapidIO-to-IP map 523 to de-encapsulate RapidIO packet 535 and map receiver RapidIO domain IP address 573 back to destination domain ID 583 and place destination domain ID in RapidIO header 580. In an embodiment, source RapidIO domain IP address 571 can also be mapped back to source domain ID 581 and placed in RapidIO header 580. Thereafter, RapidIO packet 535 can be communicated over RapidIO network in receiver RapidIO domain to a RapidIO node.

Figure 6:
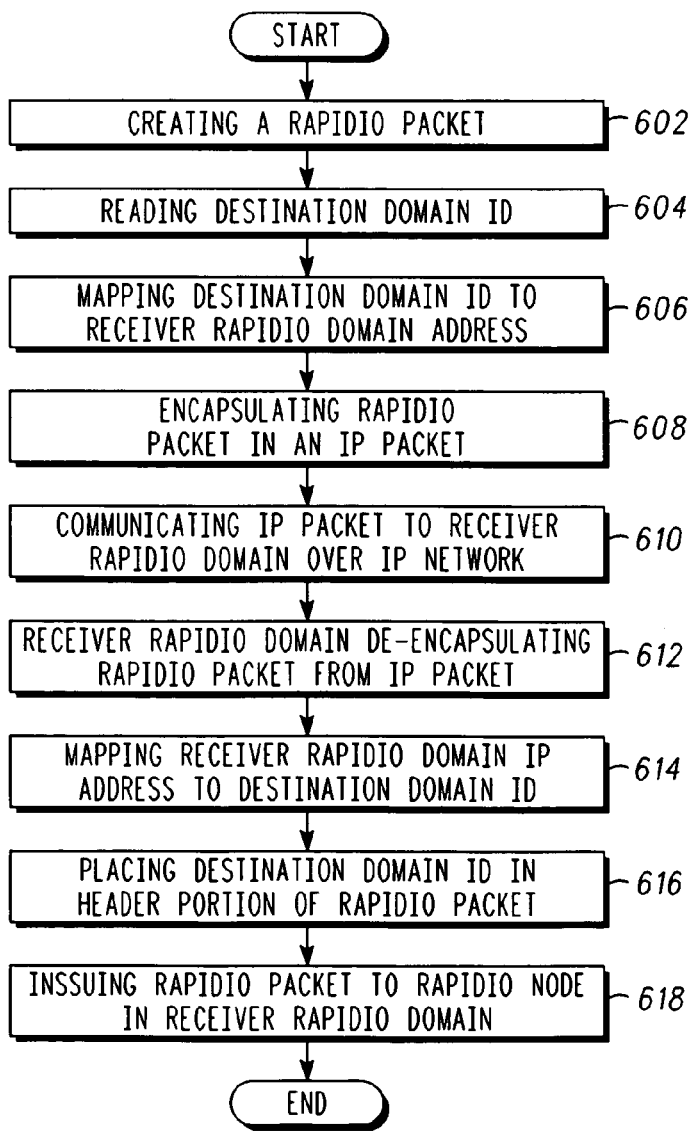
FIG. 6 illustrates a flow diagram of a method of the invention according to an embodiment of the invention.

FIG. 6 illustrates a flow diagram 600 of a method of the invention according to an embodiment of the invention. In an embodiment, FIG. 6 sets forth a method of transporting a RapidIO packet from an initiator RapidIO domain, over an IP packet network, to a receiver RapidIO domain. In step 602, a RapidIO packet is created by a RapidIO node at initiator RapidIO domain. In step 604, a RapidIO-to-IP encapsulation module can read a destination domain ID from RapidIO packet.

In step 606, RapidIO-to-IP map at initiator RapidIO domain can be used to map destination domain ID to a receiver RapidIO domain IP address. In step 608, RapidIO packet can be encapsulated in an IP packet. In step 610, IP packet can be communicated over IP packet network to receiver RapidIO domain. In step 612, RapidIO packet can be de-encapsulated from IP packet at RapidIO-to-IP encapsulation module at receiver RapidIO domain. In step 614, RapidIO-to-IP encapsulation module at receiver RapidIO domain can map receiver RapidIO domain IP address back to destination domain ID. In step 616, destination domain ID can be placed in RapidIO header of RapidIO packet. In step 618, RapidIO packet can be issued to a RapidIO node over a RapidIO network on receiver RapidIO domain.

Figure 7:
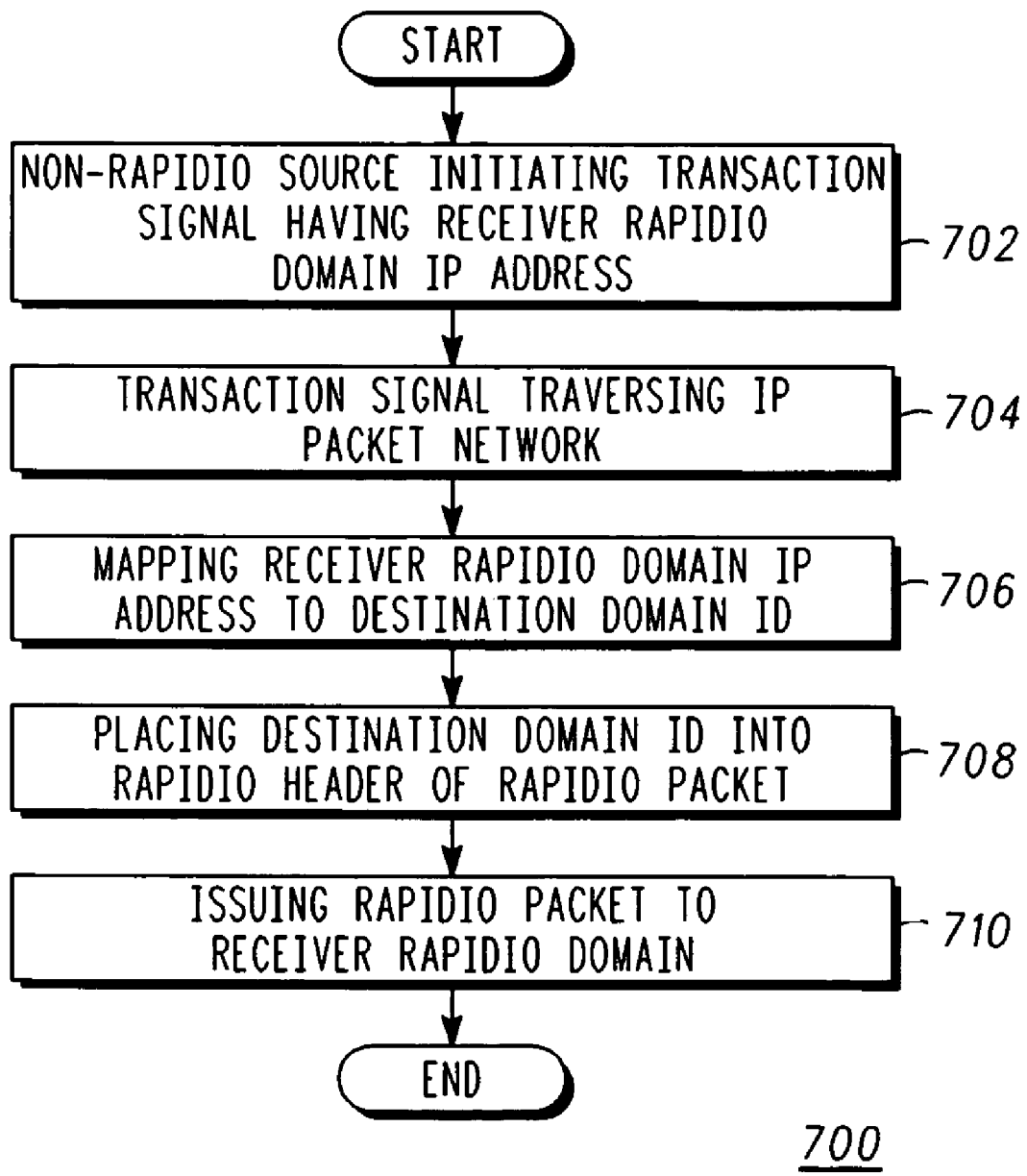
FIG. 7 illustrates a flow diagram of a method of the invention according to another embodiment of the invention.

FIG. 7 illustrates a flow diagram 700 of a method of the invention according to another embodiment of the invention. In step 702, a non-RapidIO source initiates a transaction signal having a receiver RapidIO domain IP address. Optionally, transaction signal can be received by an initiator RapidIO domain where a RapidIO packet is created. Thereafter, RapidIO packet is encapsulated as described above with reference to FIG. 6. In another embodiment, non-RapidIO source can initiate transaction signal, which can travel over IP network directly to receiver RapidIO domain, where a RapidIO packet is created. In this embodiment, a non-RapidIO source can initiate a RapidIO packet remotely from receiver RapidIO domain. In either embodiment, transaction signal traverses IP packet network per step 704. In step 706, RapidIO-to-IP map at receiver RapidIO domain can be used to be map receiver RapidIO domain IP address in transaction signal to a destination domain ID. In step 708, destination domain ID can be placed in RapidIO header of RapidIO packet. In step 710, RapidIO packet can be issued to a RapidIO node over a RapidIO network on receiver RapidIO domain.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. In a computer network, a method of transporting a RapidIO packet from an initiator RapidIO domain over an IP packet network to a receiver RapidIO domain, comprising:
   the initiator RapidIO domain creating the RapidIO packet;
   reading a destination domain ID of the RapidIO packet, wherein the destination domain ID corresponds to the receiver RapidIO domain;
   mapping the destination domain ID to a receiver RapidIO domain IP address;
   encapsulating the RapidIO packet in an IP packet; and
   communicating the IP packet to the receiver RapidIO domain over the IP packet network.

2. The method of claim 1, further comprising:
   the receiver RapidIO domain de-encapsulating the RapidIO packet from the IP packet;
   mapping the receiver RapidIO domain IP address to the destination domain ID; and
   issuing the RapidIO packet to the receiver RapidIO domain on a RapidIO network.

3. The method of claim 2, further comprising placing the destination domain ID into a RapidIO header of the RapidIO packet.

4. The method of claim 1, further comprising placing the receiver RapidIO domain IP address into an IP header of the IP packet.

5. The method of claim 1, further comprising:
   mapping a source domain ID of the initiator RapidIO domain to a source RapidIO domain IP address; and
   placing the source RapidIO domain IP address into an IP header of the IP packet.

6. The method of claim 1, wherein each of the initiator RapidIO domain and the receiver RapidIO domain has a plurality of RapidIO nodes communicating with each other over a RapidIO network.

7. The method of claim 1, further comprising
   the receiver domain initiating a communication with a third RapidIO domain;
   the receiver domain creating a second RapidIO packet;
   reading a second destination domain ID of the second RapidIO packet, wherein the second destination domain ID corresponds to the third RapidIO domain;
   mapping the second destination domain ID to a third RapidIO domain IP address;
   encapsulating the second RapidIO packet in an second IP packet; and
   communicating the second IP packet to the third RapidIO domain over the IP packet network.

8. In a computer network, a method of transporting a RapidIO packet from an initiator RapidIO domain over an IP packet network to a receiver RapidIO domain, comprising:
   the initiator RapidIO domain receiving a transaction signal from a non-RapidIO source;
   the initiator RapidIO domain creating the RapidIO packet from the transaction signal;
   reading a destination domain ID of the RapidIO packet, wherein the destination domain ID corresponds to the receiver RapidIO domain;

mapping the destination domain ID to a receiver RapidIO domain IP address;
encapsulating the RapidIO packet in an IP packet; and
communicating the IP packet to the receiver RapidIO domain over the IP packet network.

9. The method of claim 8, further comprising the transaction signal accessing the initiator RapidIO domain through a memory-mapped interface.

10. The method of claim 8, further comprising the transaction signal accessing the initiator RapidIO domain through a port-mapped interface.

11. The method of claim 8, further comprising:
the receiver RapidIO domain de-encapsulating the RapidIO packet from the IP packet;
mapping the receiver RapidIO domain IP address to the destination domain ID; and
issuing the RapidIO packet to the receiver RapidIO domain on a RapidIO network.

12. The method of claim 11, further comprising placing the destination domain ID into a RapidIO header of the RapidIO packet.

13. The method of claim 8, further comprising placing the receiver RapidIO domain IP address into an IP header of the IP packet.

14. In a computer network, a method of remotely creating a RapidIO packet on a receiver RapidIO domain, comprising:
a non-RapidIO source initiating a transaction signal having a receiver RapidIO domain IP address;
the transaction signal traversing an IP packet network to the receiver RapidIO domain;
at the receiver RapidIO domain, creating the RapidIO packet;
mapping the receiver RapidIO domain IP address to a destination domain ID;
placing the destination domain ID into a RapidIO header of the RapidIO packet; and
issuing the RapidIO packet to the receiver RapidIO domain on a RapidIO network.

15. A RapidIO domain, comprising:
a RapidIO network; and
a RapidIO-to-IP encapsulation module coupled to the RapidIO network, wherein the RapidIO-to-IP encapsulation module couples the RapidIO domain to an IP packet network, wherein the RapidIO-to-IP encapsulation module is coupled to map a destination domain ID of a RapidIO packet to a receiver RapidIO domain IP address, and wherein the RapidIO-to-IP encapsulation module is coupled to encapsulate the RapidIO packet into an IP packet.

16. The RapidIO domain of claim 15, wherein the RapidIO-to-IP encapsulation module is coupled to communicate the IP packet to a receiver RapidIO domain over the IP packet network.

17. The RapidIO domain of claim 15, wherein the RapidIO-to-IP encapsulation module is coupled to place the receiver RapidIO domain IP address into an IP header of the IP packet.

18. The RapidIO domain of claim 15, wherein the RapidIO-to-IP encapsulation module is coupled to map a source domain ID to a source RapidIO domain IP address and place the source RapidIO domain IP address into an IP header of the IP packet.

19. A RapidIO domain, comprising:
a RapidIO network; and
a RapidIO-to-IP encapsulation module coupled to the RapidIO network, wherein the RapidIO-to-IP encapsulation module couples the RapidIO domain to an IP packet network, wherein the RapidIO-to-IP encapsulation module is coupled to de-encapsulate a RapidIO packet from an IP packet, wherein the RapidIO-to-IP encapsulation module is coupled to map a receiver RapidIO domain IP address to a destination domain ID, wherein the RapidIO-to-IP encapsulation module is coupled to place the destination domain ID into a RapidIO header of the RapidIO packet, and wherein the RapidIO-to-IP encapsulation module is coupled to issue the RapidIO packet on a RapidIO network.

20. In a RapidIO domain, a method of communicating a RapidIO packet over an IP packet network, comprising:
creating the RapidIO packet;
reading a destination domain ID of the RapidIO packet;
mapping the destination domain ID to a receiver RapidIO domain IP address;
encapsulating the RapidIO packet in an IP packet; and
communicating the IP packet to a receiver RapidIO domain over the IP packet network.

21. The RapidIO domain of claim 20, further comprising placing the receiver RapidIO domain IP address into an IP header of the IP packet.

22. In a RapidIO domain, a method of communicating a RapidIO packet over an IP packet network, comprising:
receiving an IP packet over the IP packet network, wherein the IP packet comprises the RapidIO packet;
de-encapsulating the RapidIO packet from the IP packet;
mapping a receiver RapidIO domain IP address to a destination domain ID; and
issuing the RapidIO packet to the RapidIO domain on a RapidIO network.

23. The RapidIO domain of claim 22, further comprising placing the destination domain ID into a RapidIO header of the RapidIO packet.

* * * * *

UNITED STATES PATENT AND TRADEMARK OFFICE
CERTIFICATE OF CORRECTION

PATENT NO. : 7,620,047 B2  Page 1 of 1
APPLICATION NO. : 10/997300
DATED : November 17, 2009
INVENTOR(S) : Sandy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1361 days.

Signed and Sealed this

Twenty-sixth Day of October, 2010

David J. Kappos
*Director of the United States Patent and Trademark Office*